No. 870,768. PATENTED NOV. 12, 1907.
J. FARRELL.
DROP TINE GRAPPLING FORK.
APPLICATION FILED DEC. 29, 1906.
2 SHEETS—SHEET 2.
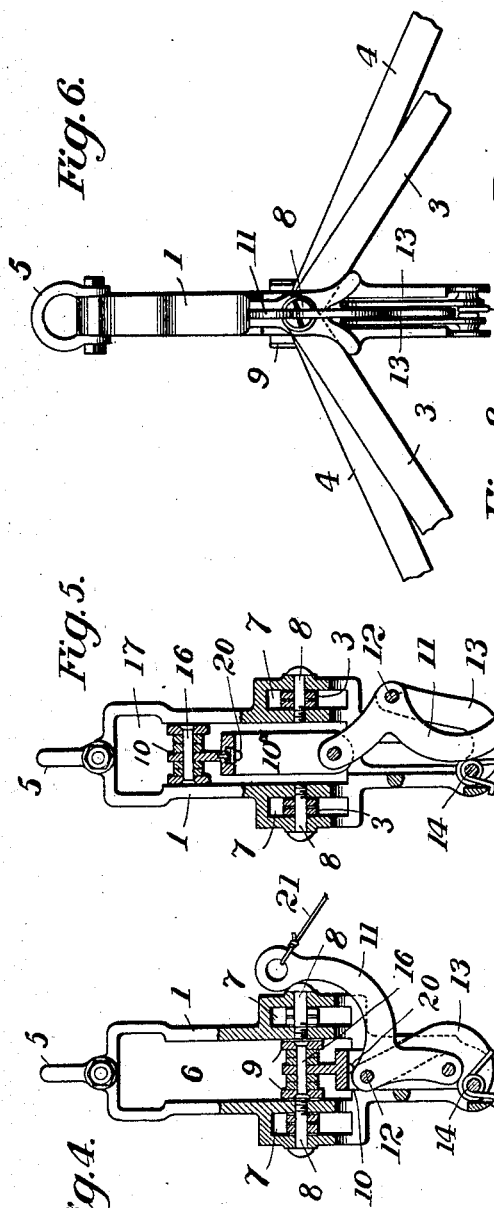
Witnesses
J. G. Strinkel
J. J. McCarthy
Inventor
John Farrell
by
Foster Freeman & Watson
Attorneys

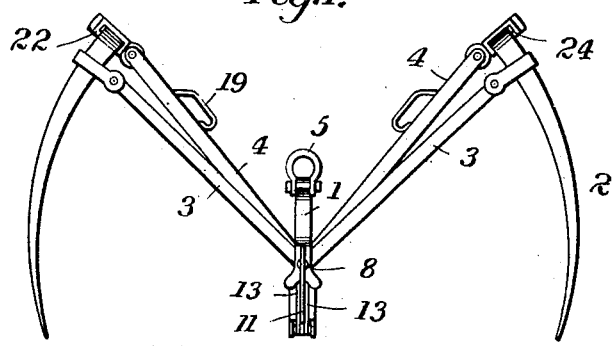
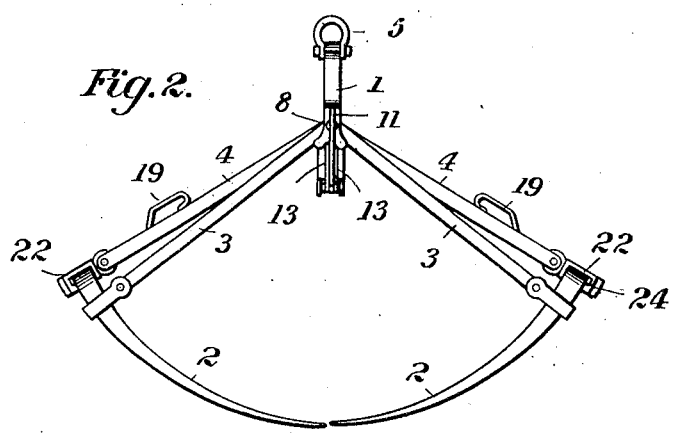
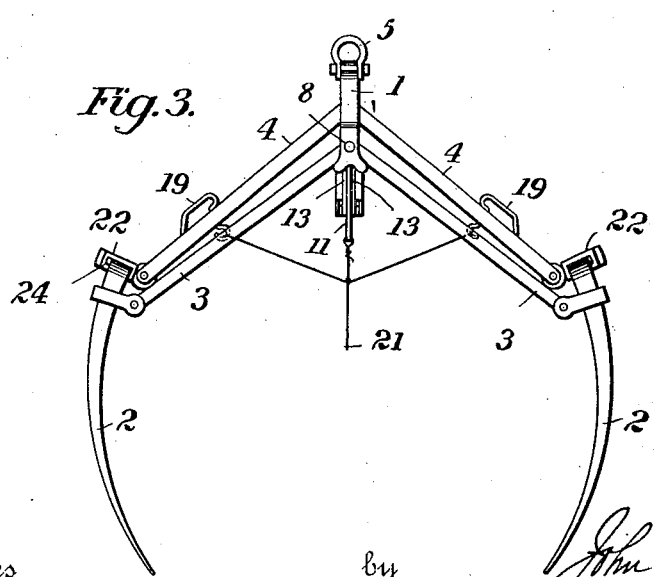

UNITED STATES PATENT OFFICE.

JOHN FARRELL, OF NEWTON, NEW JERSEY.

DROP-TINE-GRAPPLING-FORK.

No. 870,768.   Specification of Letters Patent.   Patented Nov. 12, 1907.

Application filed December 29, 1906. Serial No. 350,032.

*To all whom it may concern:*

Be it known that I, JOHN FARRELL, a citizen of the United States, and resident of Newton, Sussex county, State of New Jersey, have invented certain new and useful Improvements in Drop-Tine Grappling-Forks, of which the following is a specification.

The present invention relates to improvements in drop tine grappling forks, such as are employed for moving hay, straw, etc., and the particular object of the invention is to improve the fork illustrated and described in Letters Patent of the United States No. 418,557 issued to me on December 31, 1889.

In the accompanying drawing, Figure 1 is an elevation of the fork showing the parts in position for loading, or with the tines arranged to be thrust into a body of material to be moved; Fig. 2 is a similar view showing the tines closed, or the parts in position occupied when lifting and moving a load; Fig. 3 is a similar view showing the tines open to discharge their load; Fig. 4 is a detail view, on an enlarged scale and partly in section, of the head piece or frame of the fork, showing the parts in the position occupied when the tines are closed; Fig. 5 is a similar view showing the position of the parts with the tines opened; Fig. 6 is a side elevation showing the parts in the position represented in Fig. 4; Fig. 7 is a plan view; Fig. 8 is a detail view illustrating the means of connecting the tines and thrust bars; Fig. 9 is a detail view of a locking device for holding the slide in its lowest position.

Referring to the drawing, the fork comprises a head piece or body frame 1, two pairs of oppositely arranged tines 2, supporting bars 3 connecting each pair of tines with the head piece, a slide mounted to reciprocate in a slot formed in the head piece, thrust bars 4 connecting said slide with the tines, and means for locking said slide in position to hold the tines closed, as will be hereinafter more fully described.

The head piece of the fork is provided with a suitable clevis 5 by means of which it can be connected with a trolley or movable carriage mounted to travel on an elevated support in the ordinary manner.

It will be noticed that by the present invention the frame or head piece 1 is formed from a single casting which is provided with a main vertical slot 6 extending substantially throughout the length of the head piece and two parallel side slots 7. The tines supporting bars 3 are pivotally connected with the head piece by pins 8 extending across said side slots 7, the bars from both tines being thus connected with the head piece to rock about a common axis.

Within the main slot 6 is mounted a slide 10 having at its upper end grooves or ways to receive the side pieces of the head piece 1 and flanges 9 which project across opposite faces of said side pieces. Said slide also includes a depending arm or member 10ª, the lower end of which is pivotally connected to one end of a lever 11 which is also pivotally connected at an intermediate point of its length, as at 12, with a pair of links 13. The links 13 are pivotally connected at 14 with the lower end of the head piece 1 and in connection with the lever 11, form a toggle by means of which when the parts are in the position shown in Figs. 2 and 4, the slide block 10 will be held stationary in the lower portion of the slot 6. A coil spring 15 preferably surrounds the pivot 14 and engages with the head piece and links 13 as shown. The thrust bars 4 are pivotally connected with the upper end of said slide, being arranged between the flanged pieces 9 and connected with said pieces and the block 10 by a pin 16.

As above noted, the frame or head piece 1 is formed of a single casting and to permit of the introduction of the slide, the groove 6 in said head piece is enlarged at its upper end as at 17 so that the flanged portions 9 of said slide may be properly positioned with relation to the sides of the member 1.

By reference to Fig. 7 it will be seen that the thrust bars 4 are gradually reduced in width or tapered longitudinally from about their middle toward both ends and that each of said bars comprises a body portion, preferably made of wood, and side plates or strips 18 of metal. Also each of said thrust bars is provided with a handle 19 by means of which the tines may be opened to their fullest extent and forced downwardly into a body of hay or other material to be engaged thereby.

When the tines are closed and the fork loaded, the parts will occupy the position shown in Figs. 2 and 4 in which the pivotal connection of the thrust bars with the slide in the head piece is in alinement with the pins 8, or the axis about which the supporting bars 3 swing; and at this time the pivot 12 will have moved across the vertical plane of the pivot connecting the lever 11 and block 10 thereby constituting a toggle lock between the slide and head piece and holding the fork closed. It will be seen that the lower portion 10ª of the thrust bar slide is slotted and when the lever 11 is swung upward into the position shown in Fig. 4, or the fork is closed, a portion of said lever and the upper parts of the links 13 lie within the slot in said member 10ª. A spring pressed pin 20 is mounted in a socket in the thrust bar slide and projects into the slot in the member 10ª to engage the lever 11 when the fork is closed. This additional or supplemental lock insures the holding of the fork tines closed until the lever 11 is positively rocked by a pull on the trip rope 21; and prevents the breaking of the toggle lock above described by any slight, accidental or unintentional, strain on said lever.

The thrust bars are preferably connected with the tines in the manner shown in Figs. 7 and 8. The bar is connected with a sleeve 22 surrounding the cross bar of a pair of tines, and said sleeve and cross bar are provided with roughened or corrugated surfaces 23 at one side. A key or wedge 24 is driven between the sleeve and tine bar to hold said roughened or corrugated surfaces in engagement.

The manner of using the fork herein described will be readily understood. It will be seen that the present construction differs in several particulars from that illustrated in my prior patent. By the present invention the supporting bars 3 have both sets of tines so connected with the head piece or frame that they rock about a common axis, the thrust bars are provided with handles by which the tines may be more readily opened than was possible with the earlier construction; and the supplemental lock 20 prevents any accidental opening or unlocking of the fork while a load is being transported thereby.

The spring 15 acts to move the lever 11 into a position to lock the slide 10 in the lower portion of the head-piece or into that position where said lever will be engaged by the pin 20. As soon therefore as the load is dropped by the fork and the tines are released from the weight thereof the spring 15 will move the parts into the position shown in Fig. 4 where they will be locked as previously described.

The trip rope 21 may be attached only to the lever 11 or to said lever and the fork thrust bars as shown in Fig. 3. By attaching the rope in the manner shown in this figure it is possible by pulling on said rope to swing or turn the fork into a proper position to discharge its load as well as to trip the latch, should the fork have been turned from the position it should occupy.

Having described my invention what I claim and desire to secure by Letters Patent is, 1. The herein described grappling fork, comprising a head piece formed of a single casting having a longitudinally extending slot or opening therein, the upper end of said slot being expanded laterally beyond the sides of the body thereof, tine supporting bars pivotally connected with said head piece on opposite sides of the slot therein, a slide adapted to reciprocate in said slot in the head piece, and having its sides grooved to receive the sides of said slot, thrust bars connecting the slide and tines, a toggle adapted to hold the slide stationary at the lower end of the slot in the head piece to lock the tines in closed position, and means for releasing said lock.

2. The herein described grappling fork, comprising a head piece, two pairs of oppositely arranged tines, supporting bars extending from the tines and pivotally connected with said head piece, a slide mounted on the head piece, thrust bars connecting said slide with the tines, a toggle connecting the slide and head piece and adapted to hold the slide stationary when the tines are closed, a spring pressed pin mounted in the slide and engaging one member of the toggle when the tines are closed, and means for releasing said toggle.

3. The herein described grappling fork, comprising a head-piece, two pairs of oppositely arranged tines, supporting bars extending from the tines and pivotally connected with the head-piece, a slide on the head-piece, thrust bars connecting the slide with the tines, a toggle connecting the slide and head-piece and adapted to hold the slide stationary when the tines are closed, a latch on the slide for engaging the toggle when the tines are closed, and means for releasing said toggle.

4. The herein described grappling fork, comprising a head-piece, two pairs of oppositely arranged tines, supporting bars extending from the tines and pivotally connected with the head-piece, a slide on the head-piece, thrust bars connecting the slide with the tines, a toggle connecting the slide and head-piece and adapted to hold the slide stationary when the tines are closed, a spring acting to move said toggle into position to hold the slide stationary, a spring latch engaging the toggle when the tines are closed, and means for releasing the toggle.

5. The herein described grappling fork, comprising a head-piece, two pairs of oppositely arranged tines, supporting bars extending from the tines and pivotally connected with the head piece, a slide on the head piece, connections between said slide and the tines, a toggle connecting the slide and head piece, a spring surrounding the axis of the connection between the toggle and the head piece and acting to move the toggle into position to retain the tines in closed position, and means for releasing the toggle.

6. The herein described grappling fork, comprising a head piece, two pairs of oppositely arranged tines, supporting bars extending from the tines and pivotally connected with said head piece, a slide mounted on the head piece, thrust bars having their ends pivotally connected with said slide and the tines, a toggle connecting the head piece and slide and adapted to lock the slide against movement on the head piece when the tines are closed, and a trip rope connected with said toggle and with the thrust bars.

7. The herein described grappling fork, comprising a head piece, two pairs of oppositely arranged tines, supporting bars extending from the tines and pivotally connected with the head piece, a slide on the head piece, thrust bars each having one end pivotally connected with said slide and at its other end a sleeve that surrounds a portion of the adjacent pair of tines, one of the inner faces of said sleeve being roughened, a wedge in each sleeve on the opposite side of the tine member therein from said roughened face, a toggle connecting the head piece and slide and adapted to lock the slide against movement when the tines are closed, and means for releasing said toggle.

In testimony whereof I affix my signature in presence of two witnesses.

JOHN FARRELL.

Witnesses:
 STEPHEN WOODRUFF,
 LEWIS B. HANKINSON.